(12) United States Patent
Yang et al.

(10) Patent No.: US 11,582,024 B2
(45) Date of Patent: Feb. 14, 2023

(54) BLOCKCHAIN-BASED DECENTRALIZED PUBLIC KEY MANAGEMENT SYSTEM

(71) Applicants: Kan Yang, Germantown, TN (US); Lan Wang, Memphis, TN (US)

(72) Inventors: Kan Yang, Germantown, TN (US); Lan Wang, Memphis, TN (US)

( * ) Notice: Subject to any disclaimer, the term of this patent is extended or adjusted under 35 U.S.C. 154(b) by 234 days.

(21) Appl. No.: 16/525,378

(22) Filed: Jul. 29, 2019

(65) Prior Publication Data

US 2020/0059354 A1 Feb. 20, 2020

Related U.S. Application Data

(60) Provisional application No. 62/711,499, filed on Jul. 28, 2018.

(51) Int. Cl.
*H04L 9/06* (2006.01)
*H04L 9/00* (2022.01)
*H04L 9/08* (2006.01)

(52) U.S. Cl.
CPC ............ *H04L 9/0637* (2013.01); *H04L 9/006* (2013.01); *H04L 9/0643* (2013.01); *H04L 9/0825* (2013.01); *H04L 9/50* (2022.05)

(58) Field of Classification Search
CPC ..... H04L 9/0891; H04L 9/0643; H04L 9/006; H04L 9/3247; H04L 9/0637; H04L 9/3239; H04L 2209/38; H04L 9/0825
See application file for complete search history.

(56) References Cited

U.S. PATENT DOCUMENTS

| | | | | |
|---|---|---|---|---|
| 9,832,123 | B2 * | 11/2017 | Mosko | H04L 45/306 |
| 10,404,450 | B2 * | 9/2019 | Wood | H04L 63/062 |
| 2012/0166806 | A1 * | 6/2012 | Zhang | H04L 9/0847 |
| | | | | 713/176 |
| 2015/0244690 | A1 | 8/2015 | Mossbarger | |
| 2016/0182475 | A1 * | 6/2016 | Uzun | H04L 9/3247 |
| | | | | 713/171 |
| 2017/0236123 | A1 | 8/2017 | Ali et al. | |
| 2021/0160056 | A1 * | 5/2021 | Yan | G06F 21/602 |

OTHER PUBLICATIONS

Tong Jin, Xiang Zhang, Yirui Liu, Kai Lei "BlockNDN:A Bitcoin Blockchain Decentralized System over Named Data Networking", 2017, IEEE, p. 75-80 (Year: 2017).*
Chaoyi Bian, Zhenkai Zhu, Alexander Afanasyev, Ersin Uzun, Lixia Zhang "Deploying Key Management on NDN Testbed", NDN, Technical Report NDN-0009 http://named-data.net/techreports. html, 2013, 4 pages (Year: 2013).*

(Continued)

*Primary Examiner* — Catherine Thiaw
(74) *Attorney, Agent, or Firm* — Wayne Edward Ramage; Baker Donelson (57) ABSTRACT

A decentralized public key management system for named data networks based on blockchain, which solves the Compromised Certificate Authority (CA) Problem. The system divides the power of an individual CA among multiple Public Key Miners (PKMiners) that maintain the public key blockchains. The majority rule in name-principal validation allows the present invention to tolerate compromised PKMiners without causing any damage.

9 Claims, 10 Drawing Sheets

(56) References Cited

OTHER PUBLICATIONS

L.M. Bach et al. "Comparative Analysis of Blockchain Consensus Algorithms", MIPRO 2018, May 21-25, 2018, Opatija Croatia, IEEE, p. 1545-1550. (Year: 2018).*

Nikos Fotiou and George C. Polyzos "Decentralized Name-based Security for Content Distribution using Blockchains", Multimedia Streaming in Information-/Content-Centric Networks (MuSIC) 2016, IEEE, 6 pages (Year: 2016).*

Qi Li, Member, Xinwen Zhang, Member, Qingji Zheng, Ravi Sandhu, Fellow, and Xiaoming Fu, Senior Member "LIVE: Lightweight Integrity Verification and Content Access Control for Named Data Networking", IEEE Transactions on Information Forensics and Security, vol. 10, No. 2, Feb. 2015, p. 308-320 (Year: 2015).*

Lixia Zhang et al. "Named Data Networking (NDN) Project", NDN, Technical Report NDN-0001, Oct. 2010. http://named-data.net/techreports.html, Oct. 31, 2010, 26 pages (Year: 2010).*

Divya Saxena et al. "Named Data Networking: A survey", Computer Science Review 19, 2016, Elsevier, pp. 15-55 (Year: 2016).*

Yingdi Yu et al "An Endorsement-based Key Management System for Decentralized NDN Chat Application", NDN, Technical Report NDN-0023, 2014. http://named-data.net/techreports.html, 10 pages (Year: 2014).*

International Search Report and Written Opinion, PCT/US19/043987, Wang et al. (international filing date Jul. 29, 2019).

Article, "Blockchain-based Decentralized Public Key Management for Named Data Networking," IEEE ICCCN 2018, presented Jul. 30, 2018 (available at http://web0.cs.memphis.edu/~lanwang/paper/blockchain-NDN-icccn18.pdf).

* cited by examiner

BLOCKCHAIN-BASED DECENTRALIZED PUBLIC KEY MANAGEMENT SYSTEM

This application claims benefit of and priority to U.S. Provisional Application No. 62/711,499, filed Jul. 28, 2018, the complete specification, drawings, and appendix of which are incorporated herein by specific reference for all purposes.

FIELD OF INVENTION

This invention relates to a blockchain-based decentralized public key management system for use with public key cryptography.

BACKGROUND OF INVENTION

Named Data Networking (NDN) is an Internet architecture in which data is retrieved by its name rather than from a specific address. In NDN, each piece of data has a unique name and a consumer interested in the data sends a request for that name to the network. The network forwards the request to a suitable next hop until the named data is found. The data will then be delivered back to the consumer along the reverse path of the request. In contrast to a host-centric data delivery model, NDN data is independent from location, storage, and means of transportation, which enables efficient data distribution, multi-party communication, and robust communication in challenging networking scenarios.

NDN's data-centric retrieval model requires securing the data directly, instead of securing the channel between the sender and the receiver as in traditional IP networks. Specifically, data-centric security in NDN needs to achieve three fundamental goals: 1) Data Integrity: data cannot be modified after it is produced without being detected; 2) Data Authenticity: data is published by the claimed producer; and 3) Access Control: only consumers (producers) with appropriate authorizations can access (publish) the data. Public Key Cryptography has been used extensively in NDN to achieve these goals. Each piece of data and its associated name are bound by a cryptographic signature using the producer's private key. A data consumer checks data integrity and authenticity by verifying the signature using the producer's public key. A Name-based Access Control (NAC) scheme controls the access of named data by distributing data access keys securely using the public key of each authorized consumer.

The above schemes require validating that a named public key indeed belongs to an entity authorized to produce the data in a given name space. This validation can be based on application-specific trust models derived from the relationships among the entities that participate in the applications and who/what the entities ultimately trust. A trust schema containing a set of trust rules typically can be developed for the particular application to automatically infer the correct signing key for each received data (or key). When a data packet is received, a verification process uses the trust schema to recursively retrieve and validate each signing key until it reaches a trust anchor whose public key is pre-configured in the software or can be verified through some means outside the application. Note that the trust anchor here is typically not a public third-party Certificate Authority (CA), but rather a trusted entity within a specific application. For example, a university's student information system may use the university's public key as its trust anchor, while a company's news releases may use the company's public key as its trust anchor.

Because the application-specific trust anchors play a critical role in ensuring the security of NDN applications, it is highly desirable to develop a public key management system to store and retrieve their up-to-date validated public keys. The traditional Public Key Infrastructure (PKI) model based on Certificate Authorities (CA), however, suffers from the problem of compromised CAs, i.e., an attacker can compromise a CA to bind a key name to an unauthorized public key and produce false data using the fraudulent certificate. Even if there are multiple CAs, the compromise of one CA can inflict great damage. An alternative model is Web of Trust (WoT) which enables any user to issue a certificate (i.e., an endorsement) to anyone he or she trusts. The certificate is then trusted by whoever trusts this endorser. However, the compromise of a widely trusted endorser in WoT can still impact many users who trust this endorser. In addition, there are many practical obstacles to deploying WoT.

Accordingly, what is needed is an improved system for managing public keys that eliminates the compromised CA problem present in prior art public key management systems.

SUMMARY OF INVENTION

In various exemplary embodiments, the present invention comprises a decentralized public-key management system for managing application-specific trust anchors and other important keys in NDN. This system allows geographically and politically disparate entities to reach consensus on the state of a shared public-key database. The system uses blockchain, a decentralized ledger technology that enables the recording of transactions or any digital interactions in a secure, transparent, and auditable way. The system builds a public key blockchain for each namespace in NDN (e.g., /com, /edu, /edu/memphis, and/edu/memphis/cs), which is maintained by multiple miners that validate the principals behind public keys and create blocks containing the validated keys. Due to blockchain's properties and the validation mechanism described below, the public key management system disclosed herein is tamperproof and can tolerate $t(t<(n+1)=2)$ compromised miners out of n total miners (PKMiners). The present invention thus improves public key management in NDN, and address the compromised CA problem described above.

The nature of data-centric communication in NDN requires its security to be data-centric as well, because traditional session-based security solutions (e.g., TLS and IPSec) are no longer applicable as there is no concept of session in NDN. To achieve both data integrity and data authenticity, NDN requires that every data producer create a cryptographic signature for each piece of data with its private key to bind the data name and content together. Any data consumer can verify the signature using the public key of the producer. If the verification is successful, the consumer can make sure that the received data has not been changed (i.e., data integrity) and is from the producer (i.e., data authenticity). NDN also provides a name-based access control scheme to control the access of named data in NDN by distributing data access keys securely using the public key of each authorized consumer. In order to authorize a producer to produce data in a given namespace, an application defines a trust model and the corresponding trust schema that allows a consumer to check the following: 1) the key locator field in the data contains a key that is expected by the schema; 2) the key can be retrieved using information contained in the key locator; and 3) the signature matches the data name and content based on the retrieved public key. The verification process repeats these steps until it reaches an application-specific trust anchor.

DETAILED DESCRIPTION OF EXEMPLARY EMBODIMENTS

In various exemplary embodiments, the present invention comprises a decentralized public-key management system for managing application-specific trust anchors and other important keys in NDN. This system allows geographically and politically disparate entities to reach consensus on the state of a shared public-key database. The system uses blockchain, a decentralized ledger technology that enables the recording of transactions or any digital interactions in a secure, transparent, and auditable way. The system builds a public key blockchain for each namespace in NDN (e.g., /com, /edu, /edu/memphis, and /edu/memphis/cs), which is maintained by multiple miners that validate the principals behind public keys and create blocks containing the validated keys. Due to blockchain's properties and the validation mechanism described below, the public key management system disclosed herein is tamperproof and can tolerate $t(t<(n+1)=2)$ compromised miners out of n total miners (PKMiners). The present invention thus improves public key management in NDN, and address the compromised CA problem described above.

The nature of data-centric communication in NDN requires its security to be data-centric as well, because traditional session-based security solutions (e.g., TLS and IPSec) are no longer applicable as there is no concept of session in NDN. To achieve both data integrity and data authenticity, NDN requires that every data producer create a cryptographic signature for each piece of data with its private key to bind the data name and content together. Any data consumer can verify the signature using the public key of the producer. If the verification is successful, the consumer can make sure that the received data has not been changed (i.e., data integrity) and is from the producer (i.e., data authenticity). NDN also provides a name-based access control scheme to control the access of named data in NDN by distributing data access keys securely using the public key of each authorized consumer. In order to authorize a producer to produce data in a given namespace, an application defines a trust model and the corresponding trust schema that allows a consumer to check the following: 1) the key locator field in the data contains a key that is expected by the schema; 2) the key can be retrieved using information contained in the key locator; and 3) the signature matches the data name and content based on the retrieved public key. The verification process repeats these steps until it reaches an application-specific trust anchor.

Figure 1:
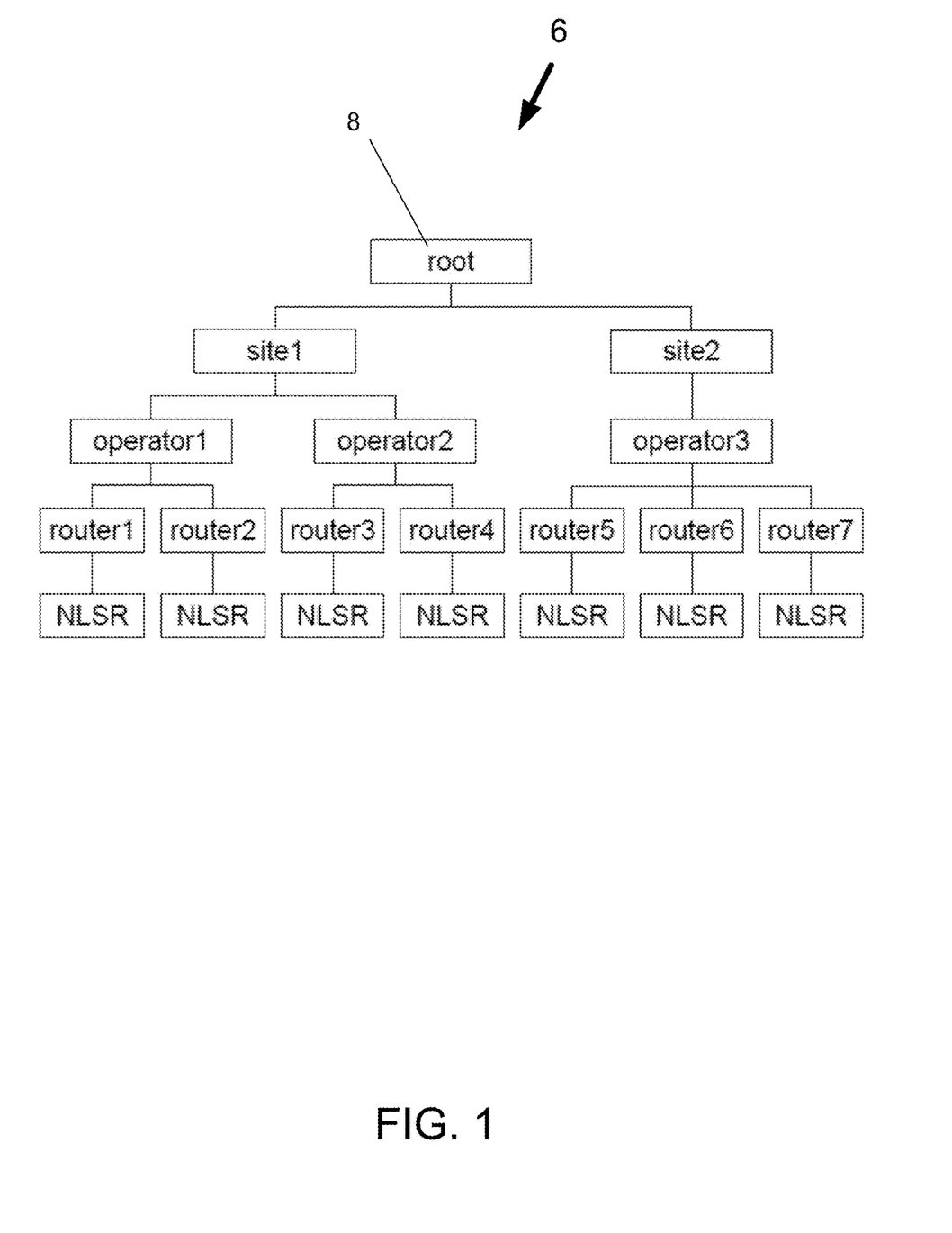
FIG. 1 shows a diagram of an NDN trust model.

FIG. 1 shows a trust model 6 used in the Named-Data Link State Routing Protocol (NLSR), an intra-domain routing protocol for NDN, where the trust anchor is the root key 8 of an entire autonomous system, e.g., the NDN testbed. The trust anchor's key may be preconfigured and distributed in the software package or manually configured by the administrator. However, it is difficult to update such keys when they expire or are revoked, and they must be protected against malicious attacks that modify them in transit or in storage.

Figure 2:
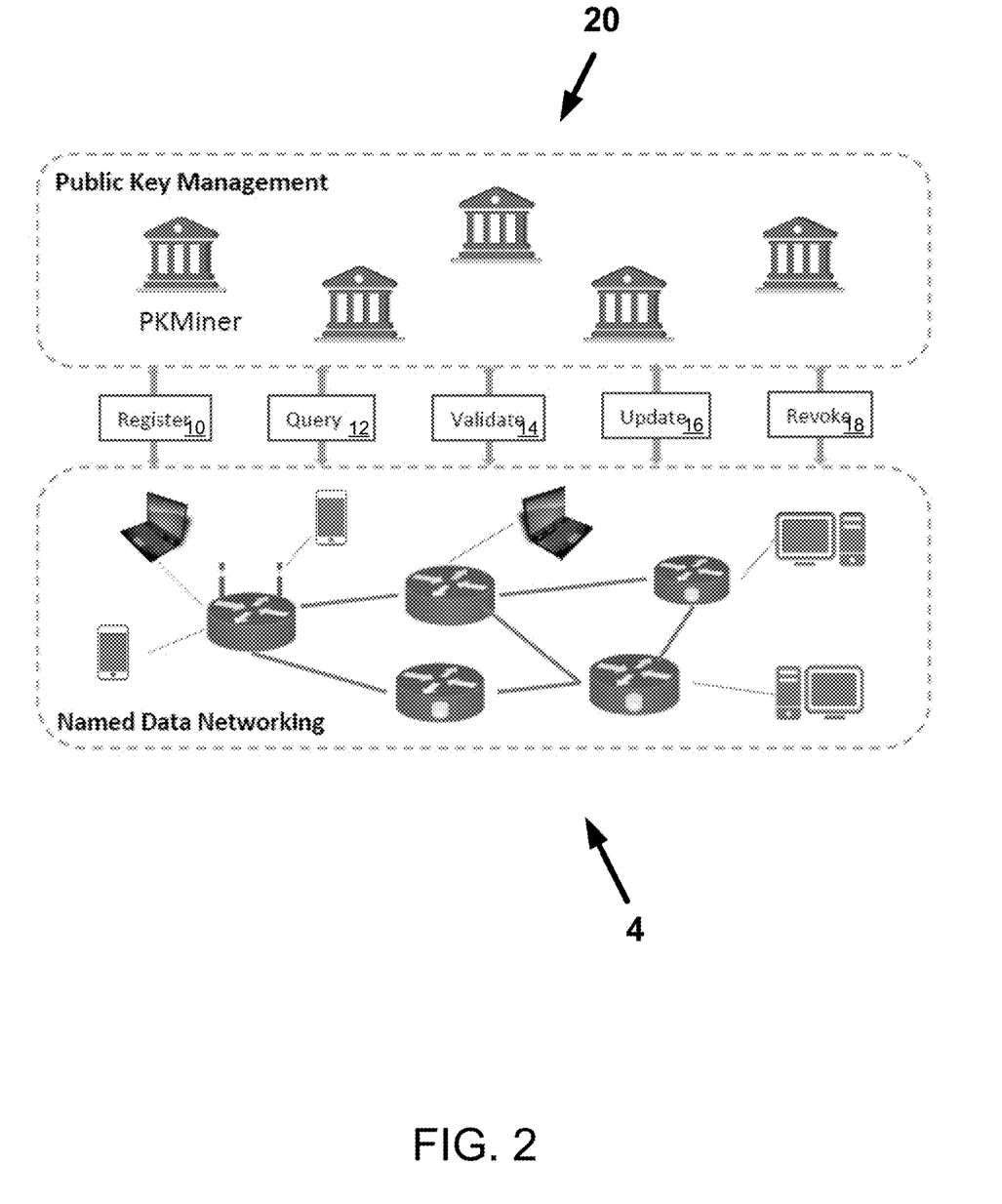
FIG. 2 shows a diagram of an NDN with a public key management system.

A public key management (PKM) system 20 provides validation and lookup service for these important keys. As shown in FIG. 2, a PKM system provides the following five functions in connection with an associated NDN 4: (1) register 10 (it allows a principal to register its public key by submitting a pair of (name, public key); (2) query 12 (it returns the corresponding public key—validated and latest—for a name; (3) validate 14 (it verifies whether a pair of (name, public key) is valid or not; (4) update 16 (it enables a principal to update its public key); and (5) revoke 18 (it revokes a principal's public key from the system).

Upon receiving a data packet, a consumer first verifies whether the data's signing public key is expected based on the application's trust schema and whether the signature in the data can be verified using the associated public key. It then queries the PKM for the trust anchor's public key and uses the trust schema to verify whether the producer's public key can be verified all the way to the trust anchor. The trust anchor's key can be cached for some time so that it does not have to be repeatedly retrieved for other data in the same application. The consumer can obtain the trust schema in several ways. If the consumer is part of the application, then the trust schema is embedded in the application, e.g., specified in the configuration. The application developer may also publish the schema using a well-defined name based on the application's namespace and sign it using the trust anchor's public key. In this way, if the consumer is not part of the application, e.g., a router in the network, it can retrieve the trust schema and verify it using the trust anchor's public key.

In principle, a PKM can be used to manage public keys generated by any entity, not just trust anchors. For example, all the public keys of universities, students, their devices, and software processes running on those devices can be stored in the PKM. The issue is whether the PKM, rather than a simple trust chain, is needed for managing specific keys deep in an application's namespace as there is overhead associated with running such a system. In this application, the word "principal" is used to represent an entity that desires to use the PKM to manage its key.

As discussed above, prior art public key management systems suffer from the Compromised CA Problem, because each CA has the complete privilege to certify new keys. Specifically, a compromised CA can launch the following attacks: (1) register public keys for illegitimate purposes (e.g., issue a certificate to a principal that cannot be authenticated correctly in practice); (2) update public keys for existing principals (e.g., arbitrarily change a public key for a principal that registered is public key under the CA); and (3) revoke public keys for legitimate principals.

The present invention solves the compromised CA problem with a blockchain-based decentralized public key management system for an NDA. In several exemplary embodiments, for each namespace, a number of designated PKMiners validate the principals that submit their public keys in that namespace and maintain a blockchain containing validated public keys. To counter attacks from compromised PKMiners, the system employs a majority rule for the public key validation. As long as at least half of the PKMiners are honest, the blockchain will not contain an invalid public key record. The chaining structure and consensus model of blockchain further ensure that the blocks containing public key records are tamperproof and consistent among the PKMiners, which is different from a traditional distributed database. Where the system is used to support an NDN, NDN data names may be used for the blockchain.

Figure 3:
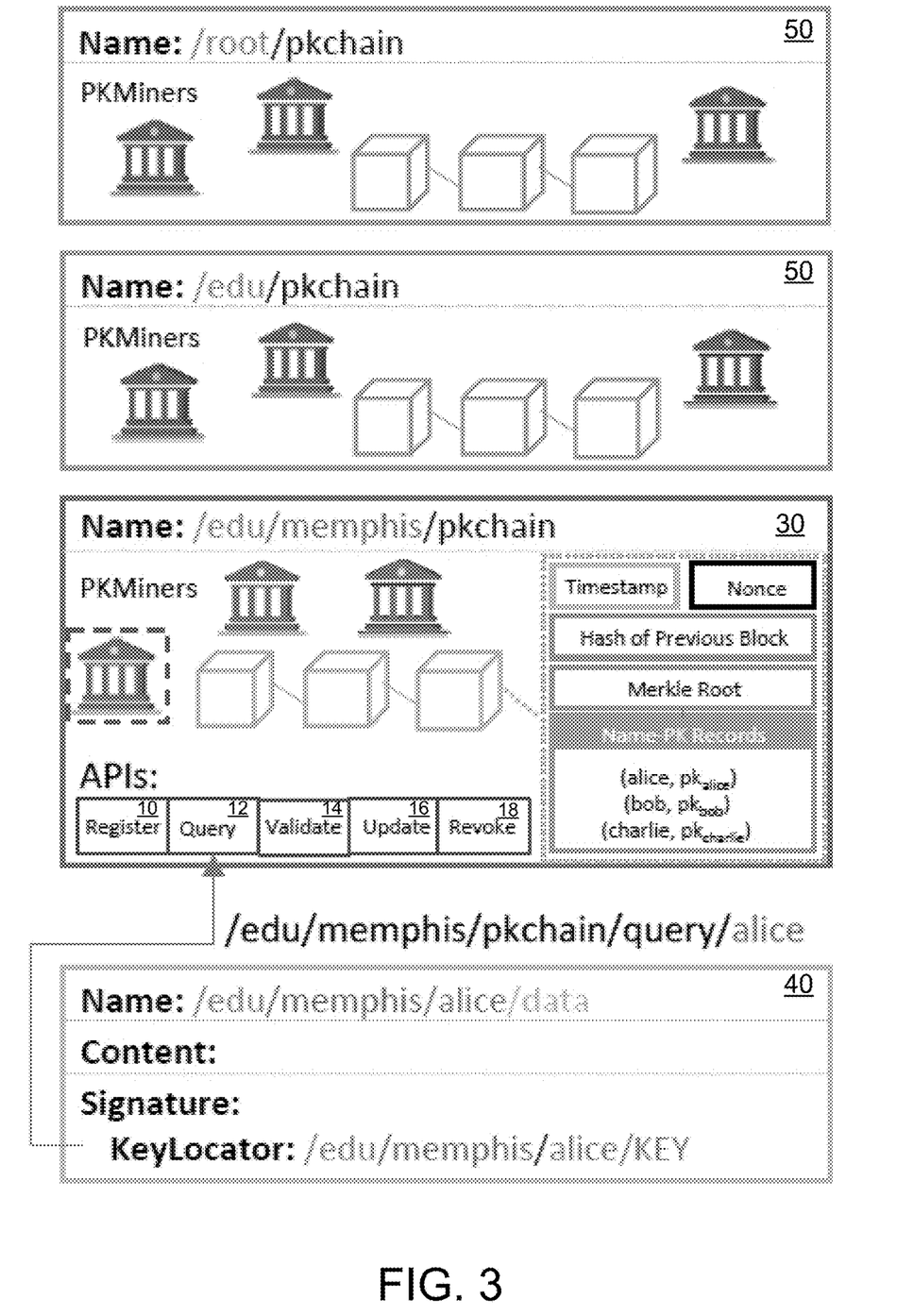
FIG. 3 shows a diagram of an exemplary embodiment of a public key management system in accordance with an embodiment of the present invention.

Thus, instead of relying on individual CAs to issue certificates, the system creates a blockchain (e.g., pkchain) 30 to manage the public keys 40, as seen in FIG. 3. This blockchain can be updated only by the PKMiners 50, but it can be retrieved by anyone, and the PKMiners provide the following services for public key management: register 10, query 12, validate 14, update 16, and revoke 18.

Register(name;pk)->Success/Fail.

Figure 4:
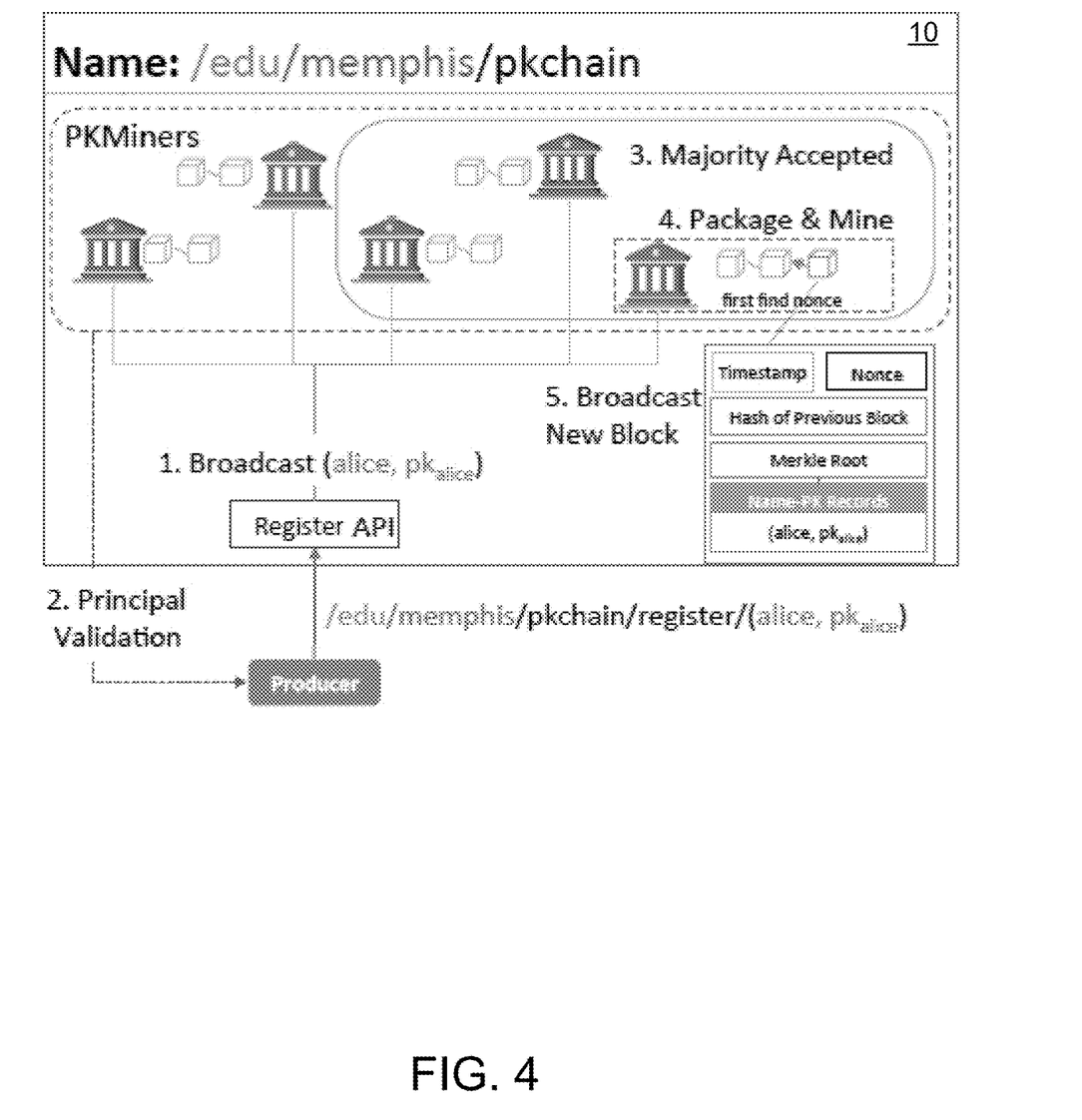
FIG. 4 shows a diagram of an example of a pair registration in accordance with the system of FIG. 3.

Any principal can register a name and bind a corresponding public key to this name. The principal is the entity behind the name. To register a pair of name and public key in the system, the principal will first generate a public-private key pair, then sign the record (name, pk) using the private key to bind the public key to the name. As shown in FIG. 4, the registration process comprises the following steps:

1) The record (name; $pk_{alice}$) is sent or broadcast to the multicast name prefix shared by all the PKMiners that maintain the blockchain.

2) Upon receiving the record (name; pk $pk_{alice}$) each PKMiner validates the principal using channels specific to the namespace, e.g., verify the university issued ID and email of the principal if the namespace belongs to a university. Then each PKMiner will notify all the other PKMiners its validation result.

3) If more than half (i.e., the majority) of the PKMiners have positive results, the principal is considered legitimate.

4) The PKMiners then put the record (name; $pk_{alice}$) into a block and start to mine it. If the blockchain uses hash-based proof-of-work for chaining and consensus, the PKMiners will compute the nonce such that the hash of the block is less than a threshold.

5) The PKMiner that first completes the mining can append this block to the blockchain and notify all the other PKMiners of the new block.

When the record is added into the blockchain, the principal receives the result "Success", otherwise it receives the result "Fail".

Query(name)->$pk_{name}$/NotFound.

The query function returns the latest and valid public key corresponding to a given name. A node can retrieve the whole chain and store the up-to-date validated name/key pairs in a hash table. For a less capable node, it can send a request to the PKMiners' name prefix to fetch the key.

Validate(name;pk)->Valid/Invalid. Given a pair of name and public key (name; pk), the verification function returns whether this pair is valid or invalid. It calls the Query function with the name, then compares the output with the given public key pk. If they are the same, it returns the result Valid. Otherwise, it returns the result Invalid.

Update(name;pk*)->Success/Fail.

This update function enables any principal to update the corresponding public key for a registered name. Because the blockchain is tamperproof, we cannot modify the content in previous blocks. Instead, we attach a new block to the blockchain to indicate the update of the public key. When updating a public key for a given name, the (name; pk*) is sent to all the PKMiners, who will redo the principal validation. With this validation, if the public key update is requested by a compromised PKMiner instead of the principal, the principal will be aware of this unexpected public key update. When the updated public key is appended to the blockchain, the Update function returns the result Success, otherwise it returns the result Fail.

Revoke(name;pk)->Success/Fail.

If a public key is compromised, it needs to be revoked. However, one cannot delete the records for that public key, as the blockchain is tamper-proof. Similar to the update operation, the system add a revoking record to indicate the pair of (name; pk) is revoked. Before completing addition of the record to the blockchain, more than half of the PKMiners must agree that the public key should be revoked. If the record is successfully added into the blockchain, the function returns the result Success. Otherwise, it returns the result Fail.

Equipped with the above API or APIs (application programming interface), the blockchain can provide all the public key management functions. For example, as shown in FIG. 4, the namespace /edu/memphis has the public key blockchain named/edu/memphis/pkchain, and /edu has the blockchain /edu/pkchain. To obtain a key for the principal named /edu/memphis/alice, one can issue an interest with the name /edu/memphis/pkchain/query/alice. Other APIs can use similar names. For example, an interest/edu/memphis/pkchain/update/(alice, pk) can be used to update the key for Alice.

The construction of the blockchain also needs the public keys of all the PKMiners, which are used for securing the communication among them. All the public keys of PKMiners who maintain the/edu/memphis/pkchain are registered in the blockchain/edu/pkchain.

Several elements of the present invention may differ from the typical Bitcoin or other public ledger systems. In Bitcoin or other public ledger systems, anyone in the system can be a miner. However, in a PKM system, it may not be desirable to enable everyone in the system to be a validator for public key registration, and thus not everyone in the system may be a miner or validator. The group of validators (PKValidators) may thus not be the same as PKMiners. Similarly, the validation of a public key may differ. In Bitcoin, the verification of a transaction can be done by just verifying all previous transactions related to that transaction. In the present invention, the validation needs to use an out-of-band mechanism specific to a namespace which may require the identity, address, email, or picture of a principal. Such an automated validation mechanism may be incorporated into the PKM. Finally, the consensus mechanism used in some implementations of the present invention may differ from Bitcoin systems. A consensus mechanism enables all the users in the system to agree on the same accepted blockchain. Bitcoin uses proof-of-work and longest chain as the consensus mechanism. However, proof-of-work wastes a huge amount of resources. The present invention thus may use more efficient consensus mechanisms, such as proof-of-stake.

Figure 5:
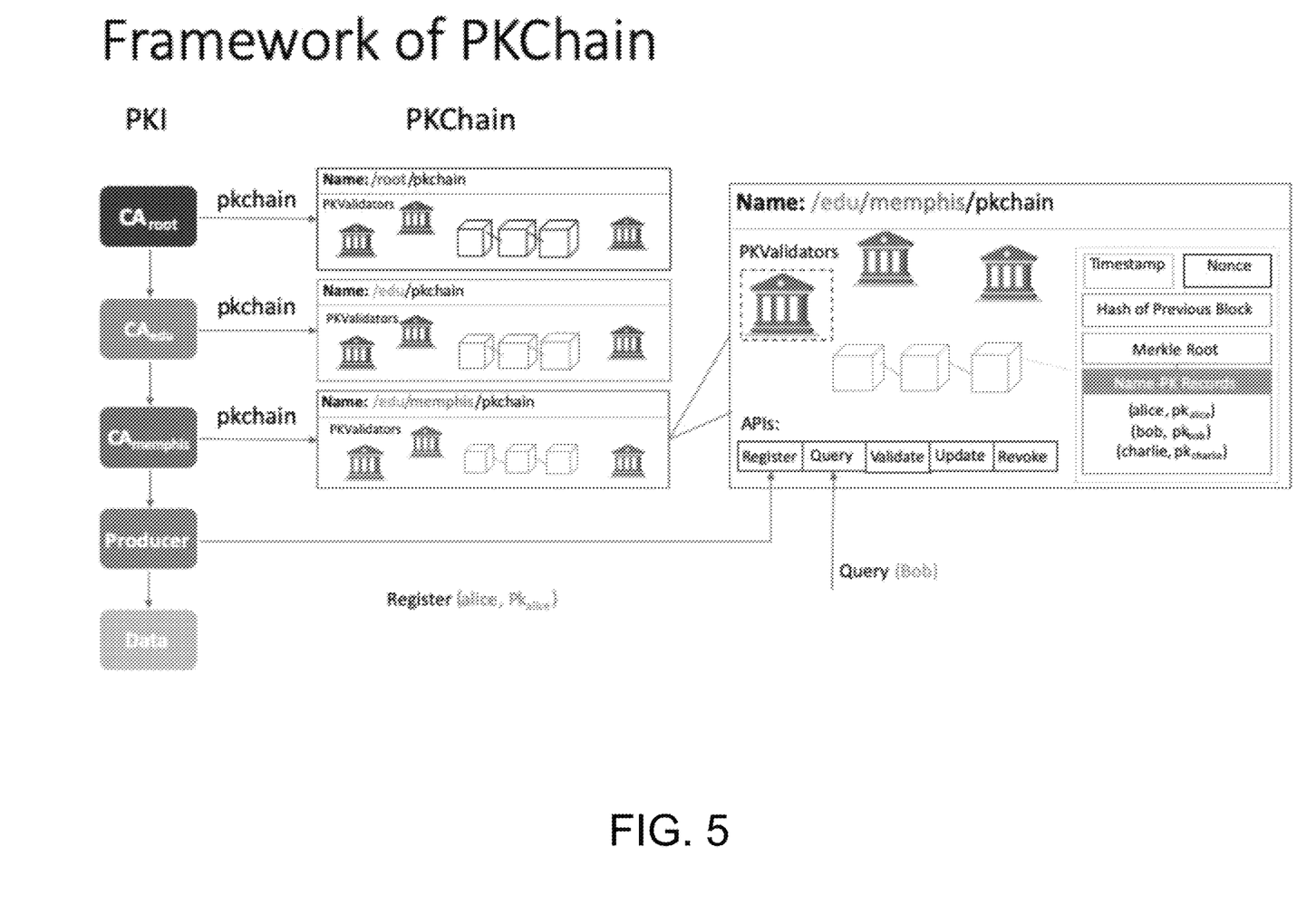
FIG. 5 shows a diagram of a blockchain-based public key management system in accordance with an embodiment of the present invention.

FIG. 5 shows an alternative framework for the present invention. Every single CA is replaced with a public key blockchain ("PKChain"). There are several PKValidators, whose privilege is significantly less than the individual CA. The PKValidators together manage the public key blockchain, which stores all the name-pk records. This system also provides the APIs for all of the public key management functions, e.g., register, query, validate, update and revoke, as seen in FIGS. 6-10.

Figure 6:
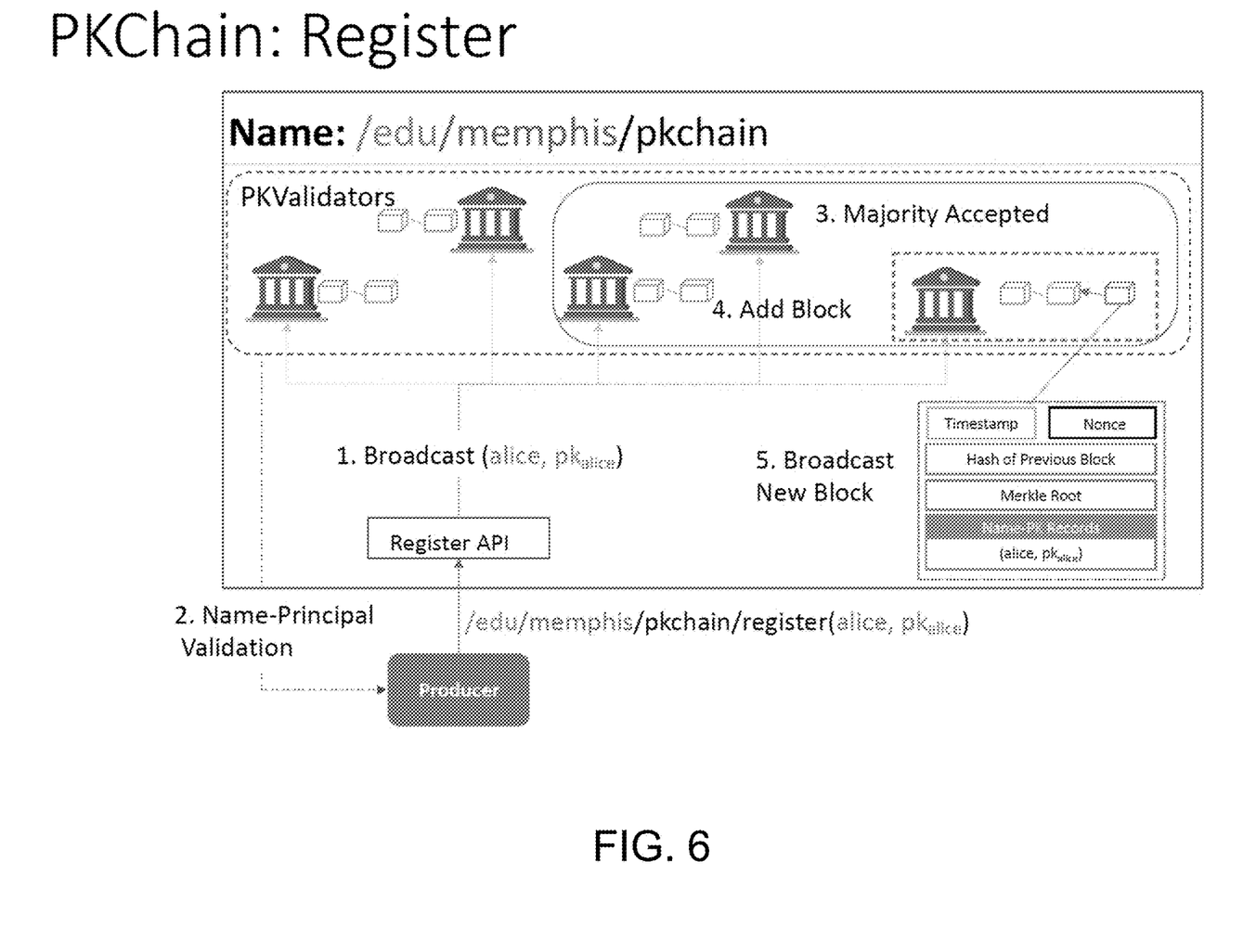
FIG. 6 shows a diagram of an exemplary registration process for the system of FIG. 5.
Figure 7:
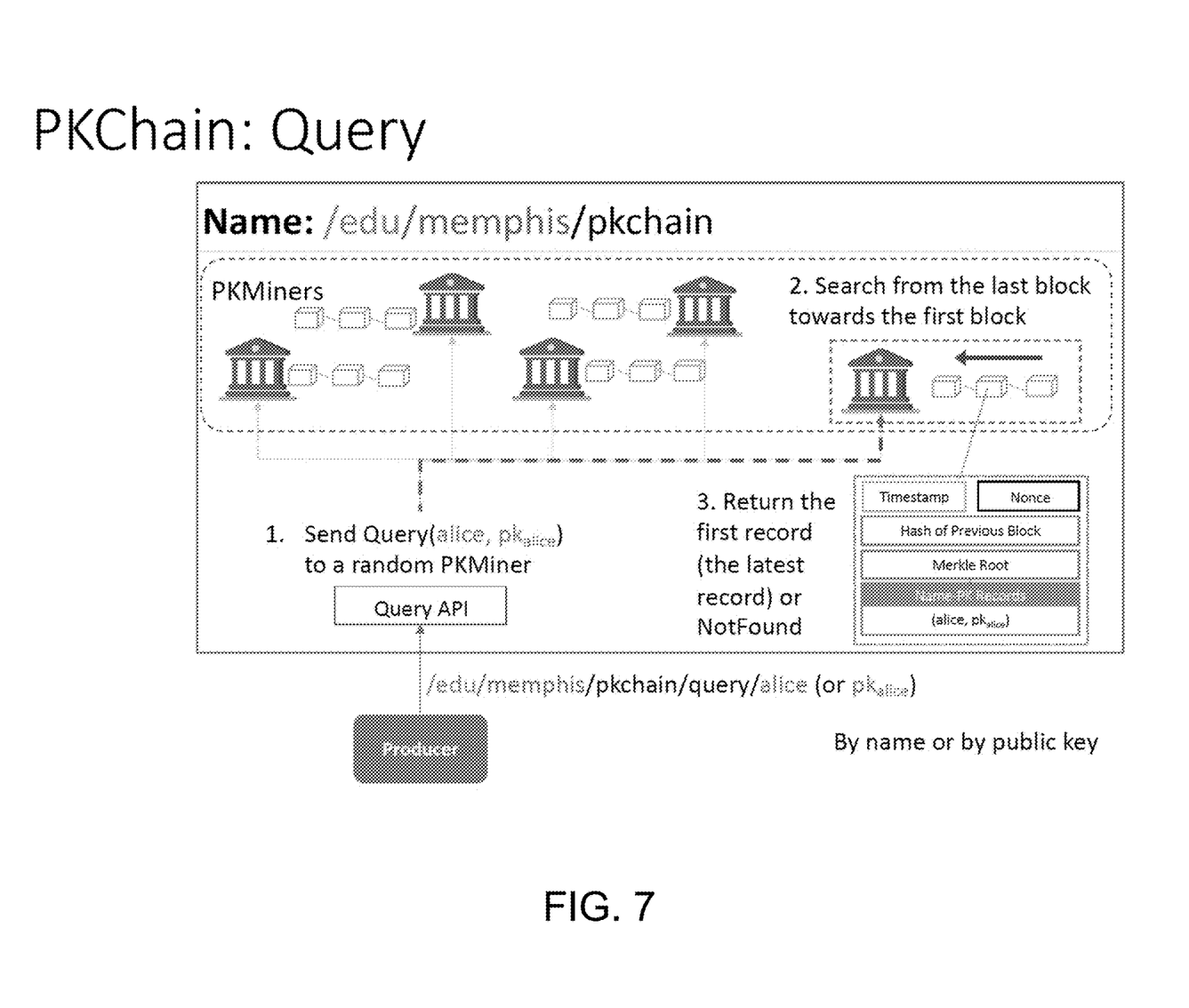
FIG. 7 shows a diagram for an exemplary query process for the system of FIG. 5.
Figure 8:
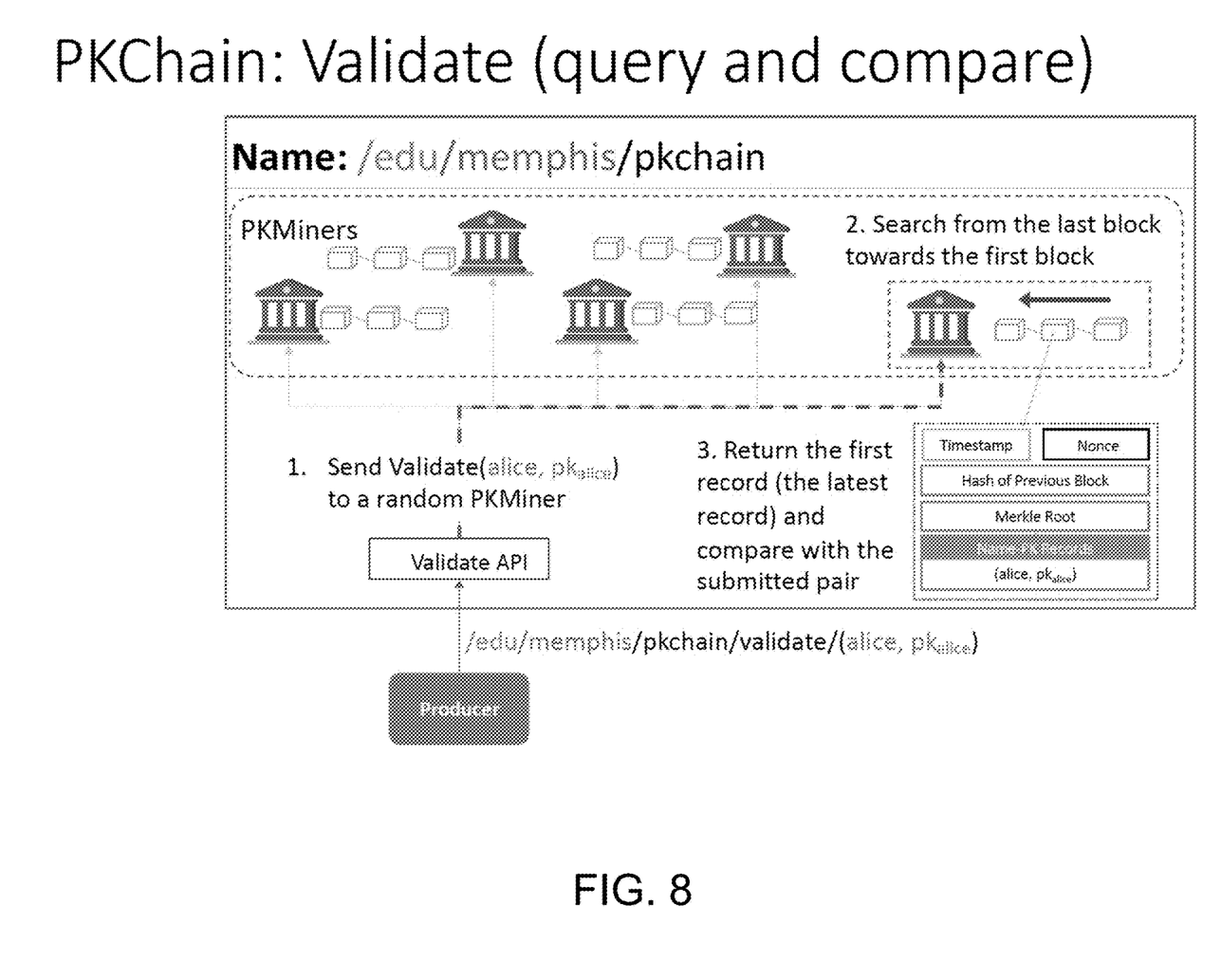
FIG. 8 shows a diagram for an exemplary validation process for the system of FIG. 5.
Figure 9:
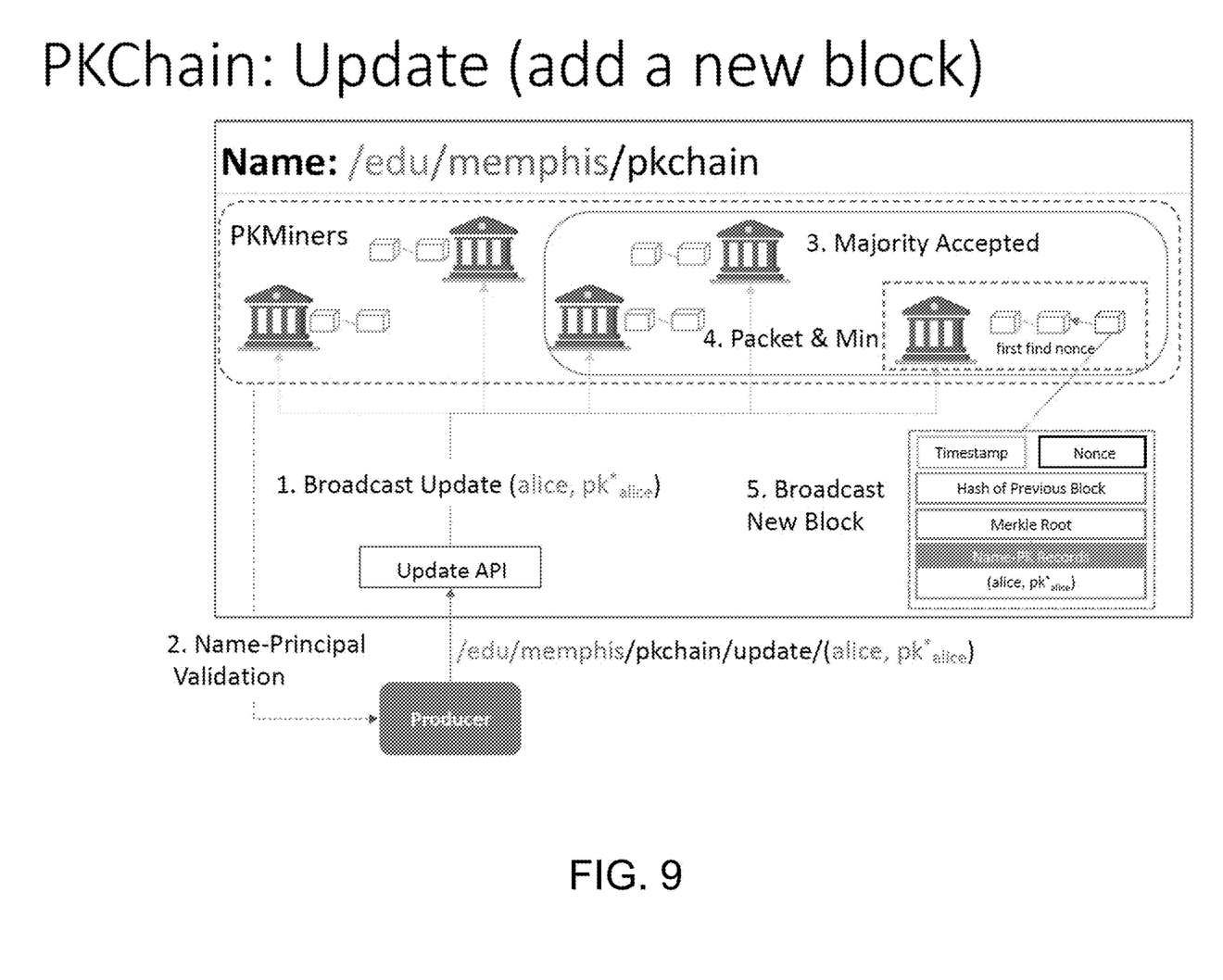
FIG. 9 shows a diagram for an exemplary update process for the system of FIG. 5.
Figure 10:
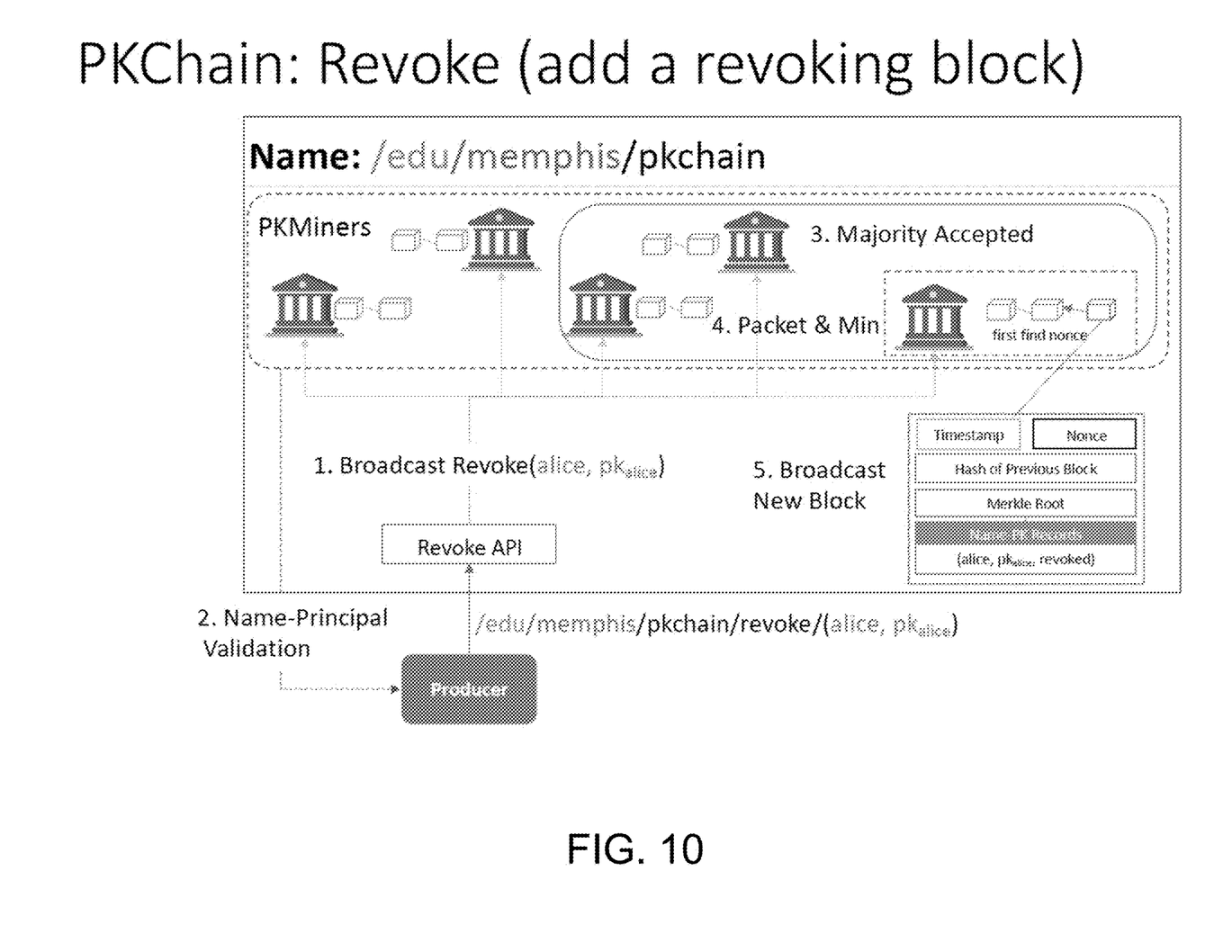
FIG. 10 shows a diagram for an exemplary revoking process for the system of FIG. 5.

FIG. 6 shows a diagram for registering a name and a public key (name-pk), e.g., (alice, $pk_{alice}$), with name-principal validation by PKValidators. FIG. 7 shows a diagram for a query process for the name and public key pair (alice, $pk_{alice}$). FIG. 8 shows a validation process (query and compare) for the name and public key pair (alice, $pk_{alice}$). FIG. 9 shows an update process (adding a new block) for the name and public key pair (alice, $pk^*_{alice}$). And FIG. 10 shows a revocation process (adding a revoking block) for the name and public key pair (alice, $pk_{alice}$).

The present invention thus can more effectively counter attacks from compromised PKMiners. For example, it can resist t out of n (n>2t−1) compromised PKMiners against registering public keys for fake principals. A compromised PKMiner may register a public key for a name that does not match the principal behind the name. For example, the PKMiner may register a public key for Eve but with a name called Bob, i.e., (Bob; pkEve). If the registration succeeds, the adversary Eve can impersonate Bob to do anything, e.g., sign a document, or receive messages sent to Bob. In the present invention, any registration request will be broadcast to all the PKMiners for validation. Each PKMiner then validates the name and principal using some other channels, and broadcasts the result to all the other PKMiners. If and only if more than half of the PKMiners (i.e., majority rule) say that the name corresponds to the principal, the PKMiners can compete to add the block. This assumes that the adversary can only compromise fewer than half of the PKMiners. Thus, even if all the compromised PKMiners broadcast a fake "validation succeed" message, the other honest PKMiners will still reject this registration request.

The compromised PKMiner in this situation may not follow the protocol, and insists on adding the record to the blockchain. The blockchain will finally be synchronized among all the PKMiners by broadcasting the new block to all the other PKMiners. Then, the honest PKMiners will find that the newly added block is not correct, as it does not pass the name-principal validation. Similarly, the present invention can also resist DoS (denial-of-service) attacks in which the compromised PKMiners deny the validation for legal principals.

As the further example, the present invention can resist t out of n (n>2t−1) compromised PKMiners against illegally updating public keys for existing principals. In the present system, the method to update the public key of an existing principal is to add a new block with a record (name, updated public key). This procedure is the same as registering a new public key, which requires all the PKMiners to redo the name-principal validation. During the name-principal validation, the PKMiner will contact the corresponding principal. If this update request is launched by a compromised PKMiner, then the principal will refuse the validation and notify all the PKMiners of this error. Upon receiving many reports from different existing principals, the PKMiners will send a notice to the upper-level blockchain, and the upper-level blockchain may revalidate the PKMiners.

The present invention also can resist t out of n (n>2t−1) compromised PKMiners against illegally revoking public keys for existing principals. To revoke a public key, a revoking record is added to the blockchain to indicate that the pair of (name, pk) is revoked. Unlike the Register and Update functions, there is no need to do the name-principal validation. Instead, more than half PKMiners should agree that the public key or the name has been revoked before competing to add the revoking block to the blockchain. Because the adversary cannot compromise more than half PKMiners, the adversary cannot maliciously revoke those still valid public keys for any existing users. Moreover, it also guarantees that the adversary cannot deny legal revocation by sending disagree messages.

Accordingly the present invention comprises a decentralized public key management system for NDN based on blockchain, which solves the Compromised CA Problem in prior art public key management systems. The present inventions divides the power of an individual CA among multiple PKMiners that maintain the public key blockchains. The majority rule in name-principal validation allows the present invention to tolerate compromised PKMiners without causing any damage.

These embodiments, as well as other exemplary embodiments, as well as the tools and programs referenced above, are described in further detail in the appendix attached and incorporated into U.S. Provisional Application No. 62/711,499, filed Jul. 28, 2018, which is incorporated herein in its entirety by specific reference.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A public-key management system for named data networks, comprising:
   a named data network comprising a plurality of namespaces, said named data network comprising a plurality of computer servers with one or more microprocessors, and one or more databases in electronic communication therewith;
   a public-key management system in electronic communication with said named data network, said public-key management system comprising a plurality of public-key blockchains, each public-key blockchain associated with a different namespace in said plurality of namespaces in the named data network, wherein each of said public-key blockchains is maintained by a plurality of validators associated with that public-key blockchain, wherein said plurality of validators validate principals behind public keys and create blocks containing said validated public keys for the public-key blockchains;

wherein no public-key blockchain is associated with more than one namespace;

wherein each validator is a designated data miner for one or more public-key blockchains;

wherein updating a corresponding public key for a registered namespace by a principal associated with that public key and a registered name is completed by appending the updated public key as a new block in the public-key blockchain after the plurality of validators validates the principal using channels specific to the registered namespace;

wherein updating the corresponding public key for the registered namespace is rejected if initiated by a validator from said plurality of validators;

wherein a revoking record is added to the public-key blockchain if the plurality of validators agree the public key should be revoked; and wherein a power of a single Certificate Authority is distributed among the validators.

2. The system of claim 1, wherein the plurality of validators do not include all miners of the blockchain.

3. The system of claim 1, wherein additions, modifications or changes to the public-key blockchain for a given namespace requires consensus by a predetermined percentage of all validators.

4. The system of claim 1, wherein additions, modifications or changes to the public-key blockchain for a given namespace requires consensus by a majority of all validators.

5. The system of claim 1, wherein the system provides one or more programming interfaces to register a new name and public-key pair with a particular public-key blockchain for an associated namespace.

6. The system of claim 1, wherein the system provides one or more programming interfaces to query for the latest valid public key corresponding to a given name for an associated namespace.

7. The system of claim 1, wherein the system provides one or more programming interfaces to validate a given name and public-key pair for an associated namespace.

8. The system of claim 1, wherein updating the corresponding public key uses one or more programming interfaces to update the public-key for the registered name for the associated namespace.

9. The system of claim 1, wherein adding the revoking record uses one or more programming interfaces to revoke the public-key for the registered name for the associated namespace.

* * * * *